(12) United States Patent
Zhong

(10) Patent No.: US 9,120,971 B2
(45) Date of Patent: Sep. 1, 2015

(54) POLYMERIZABLE MIXTURE AND LIQUID CRYSTAL COMPOSITION THEREOF

(71) Applicant: Shenzhen China Star Optoelectronics Technology Co., Ltd., Shenzhen (CN)

(72) Inventor: Xinhui Zhong, Guangdong (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 0 days.

(21) Appl. No.: 13/979,656

(22) PCT Filed: May 13, 2013

(86) PCT No.: PCT/CN2013/075535
§ 371 (c)(1),
(2) Date: Jul. 15, 2013

(87) PCT Pub. No.: WO2014/172925
PCT Pub. Date: Oct. 30, 2014

(65) Prior Publication Data
US 2015/0076404 A1 Mar. 19, 2015

(30) Foreign Application Priority Data
Apr. 25, 2013 (CN) .......................... 2013 1 0148219

(51) Int. Cl.
| C09K 19/06 | (2006.01) |
| C09K 19/56 | (2006.01) |
| C09K 19/32 | (2006.01) |
| C08F 220/18 | (2006.01) |
| C09K 19/30 | (2006.01) |
| C09K 19/54 | (2006.01) |
| C09K 19/04 | (2006.01) |
| C09K 19/12 | (2006.01) |

(52) U.S. Cl.
CPC .............. *C09K 19/56* (2013.01); *C08F 220/18* (2013.01); *C09K 19/062* (2013.01); *C09K 19/12* (2013.01); *C09K 19/3003* (2013.01); *C09K 19/322* (2013.01); *C09K 19/54* (2013.01); *C09K 2019/0444* (2013.01); *C09K 2019/0448* (2013.01); *C09K 2019/122* (2013.01); *C09K 2019/3009* (2013.01)

(58) Field of Classification Search
CPC ...... C09K 19/06; C09K 19/56; C09K 19/062; C09K 19/322; C09K 19/12; C09K 19/3003; C09K 19/54; C09K 2019/0444; C09K 2019/0448; C09K 2019/122; C09K 2019/3009
USPC ................. 252/299.4, 299.01, 299.6, 299.63, 252/299.66; 428/1.1, 1.2
See application file for complete search history.

(56) References Cited

U.S. PATENT DOCUMENTS

| 2010/0124623 A1 | 5/2010 | Wu |
| 2011/0196169 A1 | 8/2011 | Knebel et al. |
| 2014/0021408 A1 | 1/2014 | Zhong |
| 2014/0231711 A1 | 8/2014 | Zhong |
| 2014/0240653 A1 | 8/2014 | Lee et al. |

FOREIGN PATENT DOCUMENTS

| CN | 102203048 A | 9/2011 |
| CN | 102482577 A | 5/2012 |
| CN | 102732265 A | 10/2012 |
| CN | 102746855 A | 10/2012 |
| CN | 103064208 A | 4/2013 |

*Primary Examiner* — Geraldina Visconti
(74) *Attorney, Agent, or Firm* — Mark M. Friedman

(57) ABSTRACT

The invention discloses a polymerizable mixture and a liquid crystal composition for polymer stabilized vertical alignment. The polymerizable mixture comprises one or more types of the reactive monomers and a photo initiator. structure of the reactive monomer comprises a single benzene ring, two benzene rings, or a naphthalene ring, wherein the two benzene rings are formed by direct connection of two single benzene rings or indirect connection with a substituent group therebetween, the benzene ring and the naphthalene ring are directly connected with at least one polymerizable group. The liquid crystal composition includes a negative type liquid crystal material, a stabilizer, and the polymerizable mixture. The reaction rate and the conversion rate of the reactive monomer can be improved by adding the photo initiator, so that the residues of the reactive monomers can be reduced after UV irradiation to solve the panel quality problems effectively.

13 Claims, No Drawings

POLYMERIZABLE MIXTURE AND LIQUID CRYSTAL COMPOSITION THEREOF

FIELD OF THE INVENTION

The present invention relates to a polymerizable mixture, in particular relates to a polymerizable mixture for polymer stabilized vertical alignment (PSVA) and a liquid crystal composition comprising at least one type of negative-type liquid crystal molecules, a stabilizer, one or more type of reactive monomers and a photo initiator.

BACKGROUND OF THE INVENTION

Recently, as information technology continues to evolve, mobile phones, computers, and even the common household appliances are gradually developed to have advantages of intelligent, lightweight and mobility. Therefore, efficiency of information exchange between man and machine becomes critical. In order to efficiently and clearly transmit the information treated by the machine to humans, the display with high-efficiency, high-quality, high-capacity, lightweight, low-cost and low-power plays an important role and leads the traditional CRT monitor to be replaced by LCD monitors in few years.

The liquid crystal display in early year generally uses twisted nematic(TN) or super-twisted nematic(STN) mode liquid crystal materials which are the positive type nematic liquid crystal, and a certain amount of chiral agent is added. When not being energized, a longitudinal axis of the liquid crystal molecules arrange parallel to the substrate surface, arrangement direction of liquid crystal molecules on the substrate surface is determined by the rubbing direction of the alignment layer. The alignment layer is typically made of polyimide and forms a certain angle, which is generally 90 degrees, with the upper and lower surface of the substrate. Therefore, the liquid crystal molecules are arranged in a continuous state of torsion from a substrate surface to the other surface of the substrate. It is called the TN type if the twist angle is 90 degrees, or the twist angle is 270 degrees for the STN type. In addition to the upper substrate, the lower substrate and the liquid crystal layer, LCD also has a polarizer attached to the outer surface of the substrates in a direction perpendicular to the absorption axis and a backlight, etc. The light of the backlight becomes linearly polarized light through the polarizer, and then passes through the liquid crystal layer which is twistedly arranged. Therefore, the polarization direction is changed to smoothly pass another polarizer, and the display is in a transparent state. When a voltage is applied to the liquid crystal layer, the longer axis of the liquid crystal molecules tends to arrange in a direction along the electric field. At this time, the ability for changing polarization state of the liquid crystal layer is disappeared or decreased, and the display is in the opaque state or lower transparency. Therefore, the display can be controlled by changing the voltage.

TN/STN-type liquid crystal display is one of the earliest commercial displays. However, because of its small viewing angle, the difference in brightness and serious color aberration in big viewing angle, the application is greatly limited. Later, viewing angle and color issues of TN/STN display can be improved through the way of compensation film, but its manufacturing cost is raised at the same time. Further, the improvement is still not fully satisfying people's requirements for high-quality display.

Multi-domain vertical alignment (MVA) type liquid crystal display is a well solution to the restrictions of the viewing angle in TN/STN type liquid crystal display. It uses a negative liquid crystals and vertical alignment film material. When no voltage is applied, the long axis of liquid crystal molecular is perpendicular to the substrate surface. When a negative voltage is applied, the liquid crystal molecules will dump and long axis thereof tend to arrange in the direction vertical to the electric field. In order to solve the problem of viewing angle, a sub-pixel is divided into a plurality of regions, so that the liquid crystal molecules in different regions will dump in different directions. Thus, the effect will converge when the display being seen from different directions. There are many ways to make the liquid crystal molecules in different regions orient in different directions in a sub-pixel. The first way is to form the indium tin oxide electrode (Full ITO) on the whole area of the upper and lower substrate of the LCD by exposure and development, and the misalignment bumps were produced on the entire surface of the ITO electrodes of the upper and lower substrates. The liquid crystal molecules near the bumps will form a certain angle, so as to guide other liquid crystal molecules towards the predetermined direction. The second way is formed patterned indium tin oxide electrode (ITO electrode) on the upper and lower substrates, and the patterned ITO electrodes on the upper and lower substrates are arranged in misalignment position, so that the direction of the electric field generated thereby has a certain angle. Therefore, the orientation of the liquid crystal molecules in different regions can be controlled. This technique is called patterned vertical alignment (PVA). The third way is to form an ITO electrode on the side of a thin film transistor of the LCD substrate with a predetermined pattern (usually fishbone), and the entire surface of another substrate is the ITO electrode (Full ITO). The reactive monomer (RM) is added in a polymerizable liquid crystal material. First, an electric field is applied so that the liquid crystal molecules in different regions will dump towards the predetermined direction, and then UV light irradiation is applied to make the reactive monomers in the liquid crystal material proceed ultraviolet polymerization. The polymer protrusions are formed and disposed on the surface of the substrate to play the role of alignment for guiding the liquid crystal molecules. This technique is called a polymer stabilized vertical alignment (PSVA). Comparing to other MVA technology, PSVA technologies has advantages of high transmittance, high contrast and fast response, thus becoming the mainstream technology of large-size LCD panel.

A key step of PSVA technology is to control the reaction of the reactive monomer, including the reaction rate, the reaction uniformity, the residue after the reaction, and so on. Only good control of the abovementioned situation can get high-quality PSVA LCD panel. Currently, it is known that too high concentration of the residue of the reactive monomer will cause the panel image retention problems. However, it is still an important issue to well control the reactive monomers concentration after UV irradiation.

It is therefore tried by the inventor to develop a liquid crystal composition to solve the problems existing in the conventional technology as described above.

SUMMARY OF THE INVENTION

Therefore, the present invention provides a polymerizable mixture to solve the problems of the reactive monomer residual in the prior art.

The object of the present invention is to disclose a polymerizable mixture for PSVA, which enables the concentration of the reactive monomer in the panel to be controlled after the ultraviolet irradiation at a low level to avoid lowering the quality of the panel in subsequent reliability and practical experiments due to high amount of residues.

It is another object of the present invention to use a photo initiator in the polymerization reaction to improve the reaction rate and conversion rate of the reactive monomer, and the ion concentration of the liquid crystal composition will not increase at the same time, thereby the quality and reliability of the panel of PSVA LCD can be enhanced.

A further object of the present invention is to provide a liquid crystal mixture for PSVA LCD. The liquid crystal mixture contains at least one negative-type liquid crystal molecules, a reactive monomer which can proceed polymerization reaction under UV irradiation, and a photo initiator having the following structure:

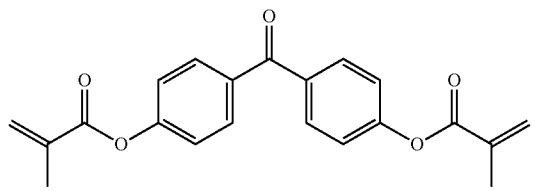 [SMILES: C=C(C)C(=O)Oc1ccc(C(=O)c2ccc(OC(=O)C(=C)C)cc2)cc1]

The photo initiator comprising a benzophenone, which is very sensitive to ultraviolet light, can absorb UV energy in a wide range of absorption spectrum and decompose to form the free radicals, cause polymerization reaction of a reactive monomer, and improve reaction rate and conversion efficiency. Meanwhile, the methacrylate groups are connected on both benzene in the photo initiator, and thus the photo initiator can proceed a polymerization reaction itself. Therefore, radicals or charged molecular fragments generated by the photo initiator can participate in the polymerization reaction to connect to the polymer, and will not cause the problem of high ionic concentration.

To achieve the above object, the present invention provides a polymerizable mixture for polymer stabilized vertical alignment, which comprises one or more types of reactive monomers which can do the polymerization reaction under UV irradiation and a photo initiator, wherein the structure of the reactive monomers comprises a single benzene ring, two benzene rings, or a naphthalene ring, wherein the two benzene rings is formed by direct connection of two single benzene rings or indirect connection with a substituent group therebetween, the benzene ring and the naphthalene ring are directly connected with at least one polymerizable group, and the photo initiator has the following structure:

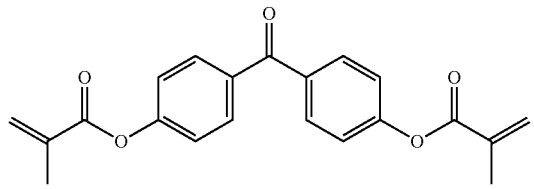 [SMILES: C=C(C)C(=O)Oc1ccc(C(=O)c2ccc(OC(=O)C(=C)C)cc2)cc1]

In one embodiment of the present invention, the one or more types of the reactive monomer has at least one structural formula as shown below:

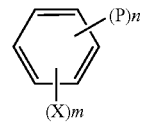

(I)

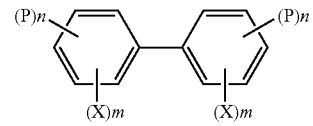

(II)

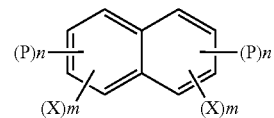

(III)

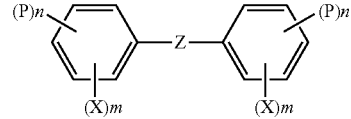

(IV)

wherein, in formula (I) to (IV), P represents a polymerizable group which is selected from at least one of methacrylate, acrylate, vinyl, vinyl oxyl group and epoxy group; n is the number of polymerizable group P connected to the same aromatic ring, n is an integer of 1-3, and the polymerizable group can be the same or different if n is greater than 1; X represents a substituent group selected from at least one of —F, —Cl, —Br, methyl, —CN, and $C_2$~$C_8$ linear or branched alkyl group, and one or more non-adjacent methyl groups in the alkyl group can be substituted by an oxygen or sulfur atoms; m is an integer of 1-3, the substituents can be the same or different if m is greater than 1; n+m is less than the maximum groups connected to the same aromatic ring; and in the formula (IV), Z is —O—, —COO—, —OCO—, —$CH_2$O—, —O$CH_2$O—, —O($CH_2$)$_2$O—, —CO$CH_2$—, methylene group, —C≡C—,

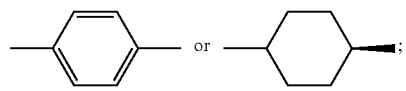

wherein at least one of n/m is different when the one or more types of reactive monomers have the same structural formula.

In one embodiment of the present invention, the hydrogen atoms on any of the aromatic ring in the structural formula of the reactive monomer can be substituted by the following groups: —F, —Cl, —Br, methyl, or —CN.

In one embodiment of the present invention, the one or more types of reactive monomers are selected from the structural formula shown below:

(V)

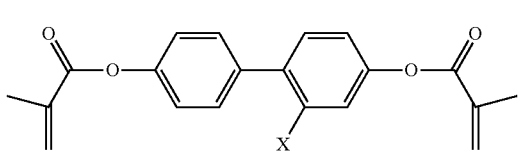

-continued

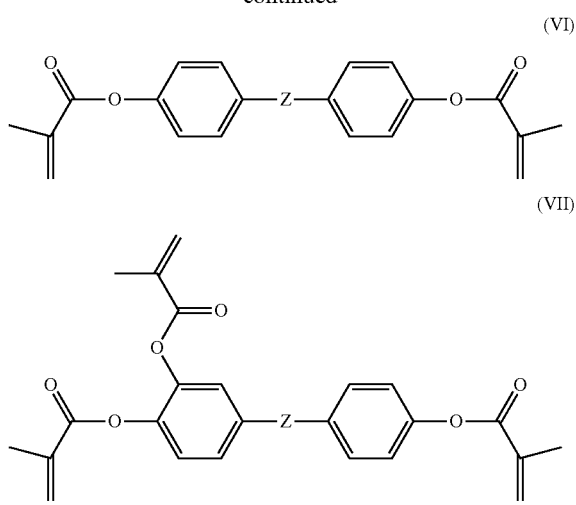

Wherein, in formula (V), X is —F or —CN; in formula (VI) and formula (VII), Z is —O—, —COO—, —OCO—, —CH$_2$O—, —OCH$_2$O—, —O(CH$_2$)$_2$O—, —COCH$_2$—, methylene group, —C≡C—,

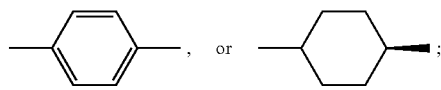

wherein the molar ratio of any one of the reactive monomers is not more than 98% of the total content of the reactive monomers.

Furthermore, another embodiment of the present invention provides a liquid crystal composition, which comprises a negative type liquid crystal material, a stabilizer and a polymerizable mixture, wherein the polymerizable mixture comprises one or more types of reactive monomers and a photo initiator, wherein the structure of the reactive monomer comprises a single benzene ring, two benzene rings, or a naphthalene ring, wherein the two benzene rings are formed by direct connection of two single benzene rings or indirect connection with a substituent group therebetween, the benzene ring and the naphthalene ring are directly connected with at least one polymerizable group, and the photo initiator has the following structure:

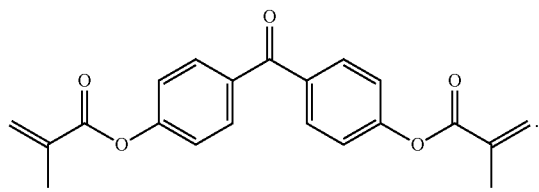 [SMILES: C=C(C)C(=O)Oc1ccc(C(=O)c2ccc(OC(=O)C(=C)C)cc2)cc1]

In one embodiment of the present invention, the weight percentage of the reactive monomers is from 0.1% to 1% based on the total weight of the liquid crystal composition.

In one embodiment of the present invention, the negative type liquid crystal material comprises at least one type of liquid crystal molecule as the following structural formula:

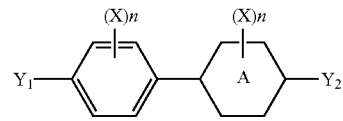

Wherein

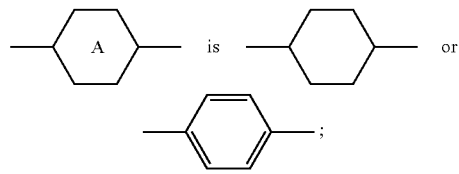

X is the substituted group connected to the ring structure, which is selected from at least one of —H, —F, —Cl, —Br, —I, —CN, or —NO$_2$; n is an integer of 1-4 and is equal or not equal on the different ring; if n>1, the plurality of substituents X are the same or different; Y$_1$ and Y$_2$ can be respectively —R, —OR, —CO—R, —OCO—R, —COO—R, or —(OCH$_2$CH$_2$)$_{n1}$CH$_3$, wherein R represents a linear or branched C$_1$~C$_{12}$ alkyl group, and n1 is an integer of 1-5, wherein Y1 and Y2 are the same or different.

In one embodiment of the present invention, the negative type liquid crystal material is

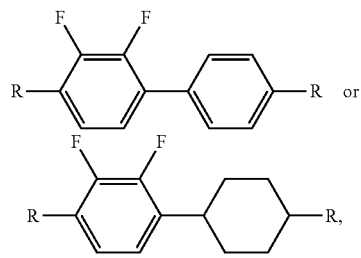

wherein R is C$_1$~C$_9$ linear or branched alkyl group, and one or more non-adjacent methyl or methylene groups in the alkyl group can be substituted by oxygen or sulfur atoms; the weight percentage of the negative type liquid crystal material is from 20% to 90% based on the total weight of the liquid crystal composition.

In one embodiment of the present invention, the stabilizer comprises at least one type of stabilizer molecule having the structural formula as follows:

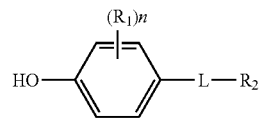

Wherein, R$_1$ is at least one of C$_1$~C$_9$ linear or branched alkyl group, n is an integer of 1-4; a plurality of substituent groups R$_1$ are the same or different when n>1; R$_2$ represents C$_1$~C$_{36}$ linear or branched alkyl group; L is —C—C—, —O—, —COO—, —OCO—, —CH$_2$O—, —OCH$_2$O—, —O(CH$_2$)$_2$O—, —COCH$_2$—, or a methylene group.

In one embodiment of the present invention, the stabilizer comprises at least one stabilizer having the structural formula as follows:

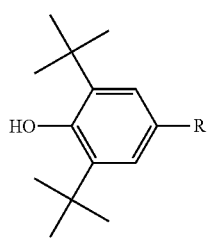

Wherein, R is $C_1 \sim C_{30}$ linear or branched alkyl group, and one or more non-adjacent methyl or methylene groups in the alkyl group can be substituted by oxygen or sulfur atoms.

In one embodiment of the present invention, the weight percentage of the stabilizer is less than 1% based on the total weight of the liquid crystal composition.

In one embodiment of the present invention, the weight percentage of the photo initiator is from 0.1% to 1% based on the total weight of the liquid crystal composition.

The content of the present invention can be more fully understood hereinafter by referring to the following detailed description of preferred embodiment, as follows:

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

The first embodiment in the present invention provides a polymerizable mixture for polymer stabilized vertical alignment (PSVA). The polymerizable mixture comprises one or more types of the reactive monomer polymerized under UV irradiation, and a photo initiator as the following structure:

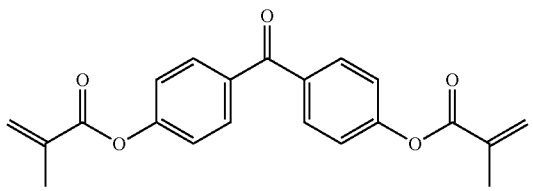 [SMILES: C=C(C)C(=O)Oc1ccc(C(=O)c2ccc(OC(=O)C(=C)C)cc2)cc1]

The photo initiator can be prepared by the following synthetic steps, the corresponding variant or derivative can be obtained from the respective raw materials in the same reaction.

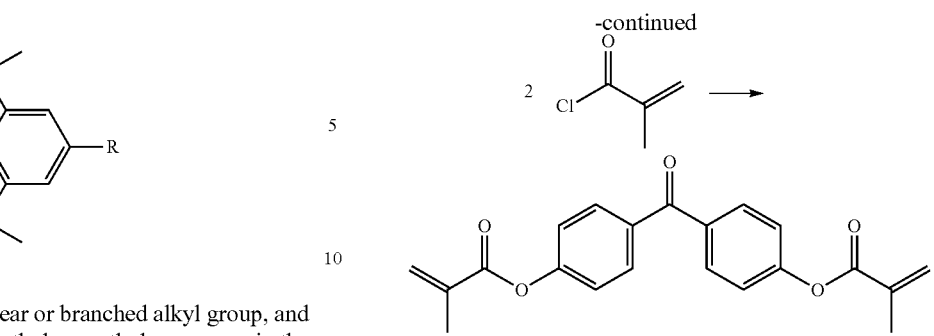

Since the photo initiator has a benzophenone structure which can absorb UV energy in a wide spectral range and decompose into free radicals, thereby triggering polymerization of the reactive monomer. There are various ways for the photo initiator to divide into radicals under UV irradiation. One of the more common cleavage reactions is described as follows. The benzoyl radical in left side of the two radicals has high activity and is easy to trigger the polymerization of the polymerizable monomer. The right one can also participate in the polymerization reaction due to its phenyl radical, which is a polymerizable group, and is not easy to produce charged ions.

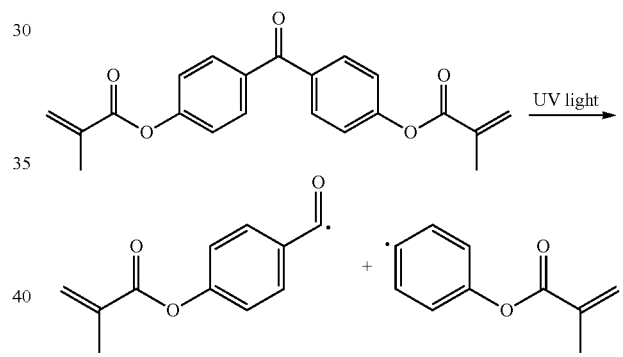

Through the above-mentioned reaction, the polymerization rate and the conversion rate of the reactive monomer can be improved. The photo initiator has two benzene rings which are both connected with methacrylate groups, thus the polymerization reaction may occur itself, so that the generated free radicals, charged molecules or fragments will tend to participate in the polymerization reaction to connect to polymers, and the problem of high concentration of residual ions will not occur.

A second embodiment in the present invention provides a liquid crystal composition comprises a negative type liquid crystal material, a stabilizer and the polymerizable mixture as abovementioned. The negative type liquid crystal material comprises at least one type of liquid crystal molecule with the following structural formula:

Wherein

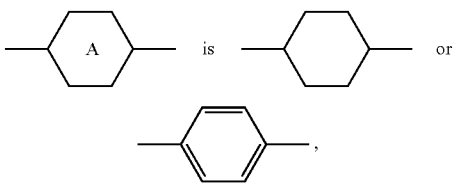 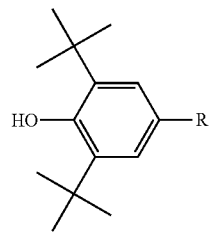

X is the substituted group connected to the ring structure, which is selected from at least one of —H, —F, —Cl, —Br, —I, —CN, or —NO$_2$; n may be an integer of 1-4 and is equal or not equal on the different ring; if n>1, the plurality of substituents X are the same or different; Y$_1$ and Y$_2$ may be respectively —R, —OR, —CO—R, —OCO—R, —COO—R, or —(OCH$_2$CH$_2$)$_{n1}$CH$_3$, wherein R represents a linear or branched C$_1$~C$_{12}$ alkyl group, and n1 is an integer of 1-5, wherein Y$_1$ and Y$_2$ are the same or different. For example, the negative type liquid crystal material may be the following structural formula:

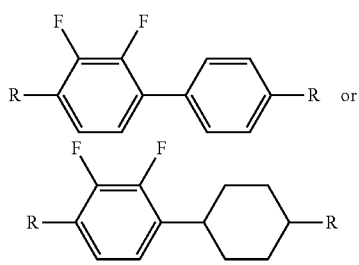

Wherein R is C$_1$~C$_9$ linear or branched alkyl group, and one or more non-adjacent methyl or methylene groups in the alkyl group may be substituted by oxygen or sulfur atoms. The negative type liquid crystal material could be the liquid crystal molecules without double bond substituents, i.e. only having alkyl groups substituted, for example, the liquid crystal molecules for traditional vertical alignment (VA-LC).

In addition, the stabilizer comprises at least one type of stabilizer molecule having the structural formula as follows:

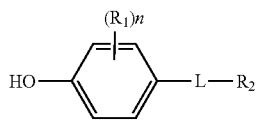

Wherein, R$_1$ is at least one of C$_1$~C$_9$ linear or branched alkyl group, n is an integer of 1-4; a plurality of substituent groups R$_1$ are the same or different when n>1; R$_2$ represents C$_1$~C$_{36}$ linear or branched alkyl group; L is —C═C—, —O—, —COO—, —OCO—, —CH$_2$O—, —OCH$_2$O—, —O(CH$_2$)$_2$O—, —COCH$_2$—, or a methylene group. For example, in one embodiment of the present invention, the stabilizer comprises at least one stabilizer having the structural formula as follows:

Wherein, R is C$_1$~C$_{30}$ linear or branched alkyl group, and one or more non-adjacent methyl or methylene groups in the alkyl group may be substituted by oxygen or sulfur atoms. By adding the stabilizer, the liquid crystal composition will keep stable in the storage and transportation process and avoid polymerization reaction of the reactive monomer occurs in advance.

According to the liquid crystal composition of the present invention, the reactive monomer may be able to react with an alignment film containing a polyimide to form an alignment polymer for guiding the molecules of the negative liquid crystal material. The negative-type liquid crystal material may contain one or more types of the reactive monomers having the structural formula as follows:

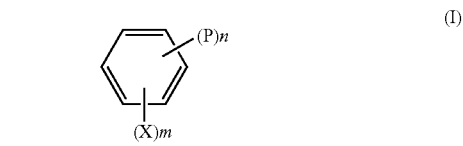 (I)

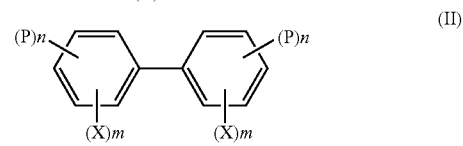 (II)

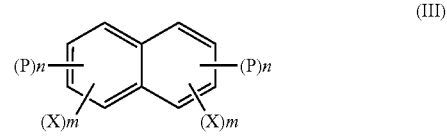 (III)

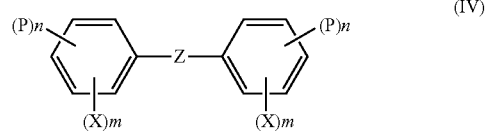 (IV)

Wherein, in formula (I) to (IV), P represents a polymerizable group which is selected from at least one of methacrylate, acrylate, vinyl, vinyl oxyl group and epoxy group; n is the number of polymerizable group P connected to the same aromatic ring, n is an integer of 1-3, and the polymerizable group may be the same or different if n is greater than 1; X represents a substituent group selected from at least one of —F, —Cl, —Br, methyl, —CN, and C$_2$~C$_8$ linear or branched alkyl group, and one or more non-adjacent methyl groups in the alkyl group may be substituted by an oxygen or sulfur atoms; m is an integer of 1-3, the substituents may be the same or different if m is greater than 1; n+m is less than the maximum groups connected to the same aromatic ring; and in the formula (IV), Z is —O—, —COO—, —OCO—, —CH$_2$O—, —OCH$_2$O—, —O(CH$_2$)$_2$O—, —COCH$_2$—, methylene group, —C≡C—,

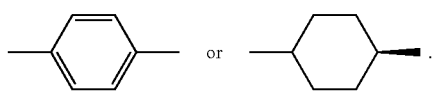

The hydrogen atoms on any of the aromatic ring in the structural formula (I) to (IV) of the reactive monomer may be substituted by the following groups: —F, —Cl, —Br, methyl, or —CN. The reactive monomer may for example have one or more of the structural formula shown below:

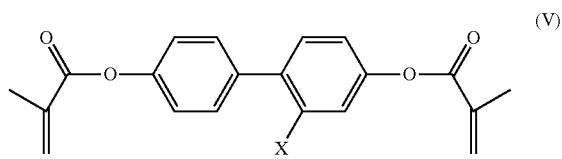 (V)

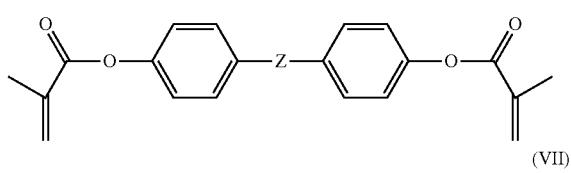 (VI)

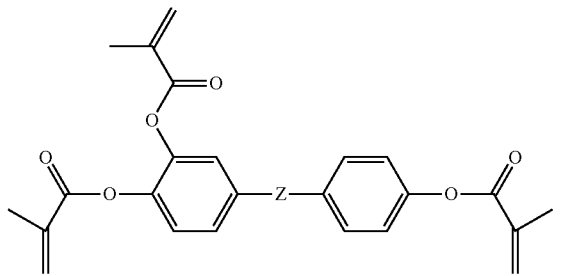 (VII)

In formula (V), X is —F or —CN; and in formula (VI) and (VII), Z is —O—, —COO—, —OCO—, —CH$_2$O—, —OCH$_2$O—, —O(CH$_2$)$_2$O—, —COCH$_2$—, methylene group, —C≡C—,

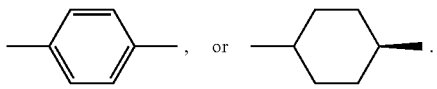

The molar ratio of any one of the reactive monomers is not more than 98% of the total content of the reactive monomers. For example, when there are two reactive monomers existing, the molar ratios of the two reactive monomer is between 2:98 and 98:2. Another example is that when there are three or more monomers existing, the molar ratio of any of them is not over 98% of the total monomers.

According to a preferred embodiment of the present invention, the weight percentage of the negative type liquid crystal material is from 20% to 90% based on the total weight of the liquid crystal composition and may for example be 25%, 35%, 50% or 80%, etc. The weight percentage of the stabilizer is less than 1% based on the total weight of the liquid crystal composition and may for example be 0.2%, 0.5%, or 0.85%. The weight percentage of the reactive monomers is from 0.1% to 1% based on the total weight of the liquid crystal composition and may for example be 0.15%, 0.25%, 0.3%, 0.5% or 0.75%, etc. The weight percentage of the photo initiator is from 0.1% to 1% based on the total weight of the liquid crystal composition and may for example be 0.01%, 0.05%, 0.1%, 0.3%, 1%.

As described above, there is the problem of reactive monomer residues in the prior art, the present invention provides the above-mentioned photo initiators which can really improve the reaction rate and the conversion rate of the reactive monomer, so that, the reactive monomer residues would decrease after UV irradiation. It is an effective solution for the quality problems of the panel.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A liquid crystal composition, comprising:
a liquid crystal material, a stabilizer and a polymerizable mixture, wherein the polymerizable mixture comprises at least one reactive monomers and a photo initiator, wherein the structure of the reactive monomer comprises a single benzene ring, two benzene rings, or a naphthalene ring, wherein the two benzene rings are formed by direct connection of two single benzene rings or indirect connection with a substituent group therebetween, and the photo initiator has the following structure:

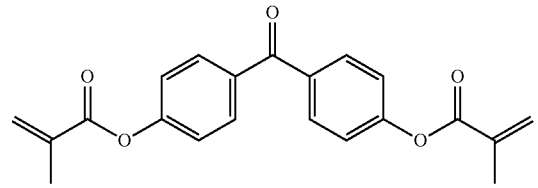 [SMILES: C=C(C)C(=O)Oc1ccc(C(=O)c2ccc(OC(=O)C(=C)C)cc2)cc1]

wherein the weight percentage of the reactive monomers is from 0.1% to 1% based on the total weight of the liquid crystal composition and the weight percentage of the photo initiator is from 0.1% to 1% based on the total weight of the liquid crystal composition.

2. A polymerizable mixture for polymer stabilized vertical alignment, comprising at least reactive monomers and a photo initiator, wherein the structure of the reactive monomers comprises a single benzene ring, two benzene rings, or a naphthalene ring, wherein the two benzene rings is formed by direct connection of two single benzene rings or indirect connection with a substituent group therebetween, and the photo initiator has the following structure:

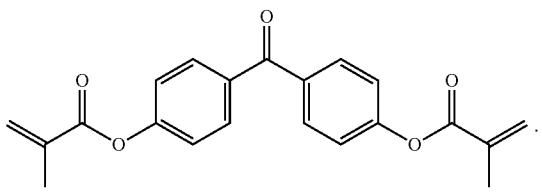 [SMILES: C=C(C)C(=O)Oc1ccc(C(=O)c2ccc(OC(=O)C(=C)C)cc2)cc1]

3. The polymerizable mixture according to claim 2, wherein the at least one reactive monomer has at least one structural formula as shown below:

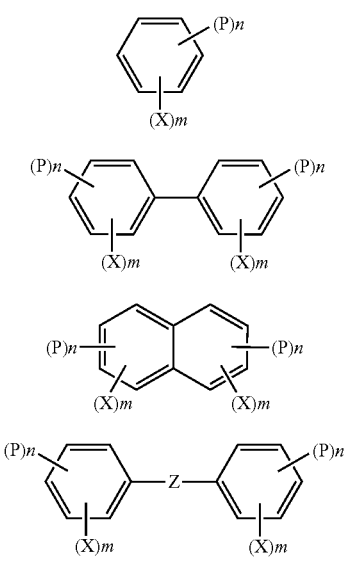

wherein, in formula (I) to (IV), P represents a polymerizable group which is selected from at least one of methacrylate, acrylate, vinyl, vinyl oxyl group and epoxy group; n is the number of polymerizable group P connected to the same aromatic ring, n is an integer of 1-3, and the polymerizable group can be the same or different if n is greater than 1; X represents a substituent group selected from at least one of —F, —Cl, —Br, methyl, —CN, and $C_2$~$C_8$ linear or branched alkyl group, and one or more non-adjacent methyl groups in the alkyl group can be substituted by an oxygen or sulfur atoms; m is an integer of 1-3, the substituents can be the same or different if m is greater than 1; n+m is less than the maximum groups connected to the same aromatic ring; and in the formula (IV), Z is —O—, —COO—, —OCO—, —CH$_2$O—, —OCH$_2$O—, —O(CH$_2$)$_2$—, —COCH$_2$—, methylene group, —C≡C—,

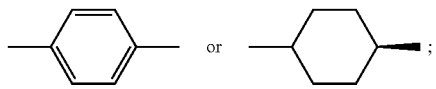

wherein at least one of n and m is different from the others when the at least one reactive monomers comprises one of the structural formula (I)~(IV).

4. The polymerizable mixture according to claim 3, wherein the hydrogen atoms on any of the aromatic ring in the structural formula of the reactive monomer can be substituted by the foil wing groups: —F, —Cl, —Br, methyl, or —CN.

5. The polymerizable mixture according to claim 3, wherein the at least one reactive monomer is selected from the structural formula shown below:

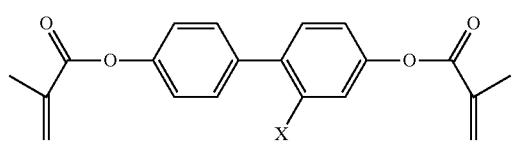

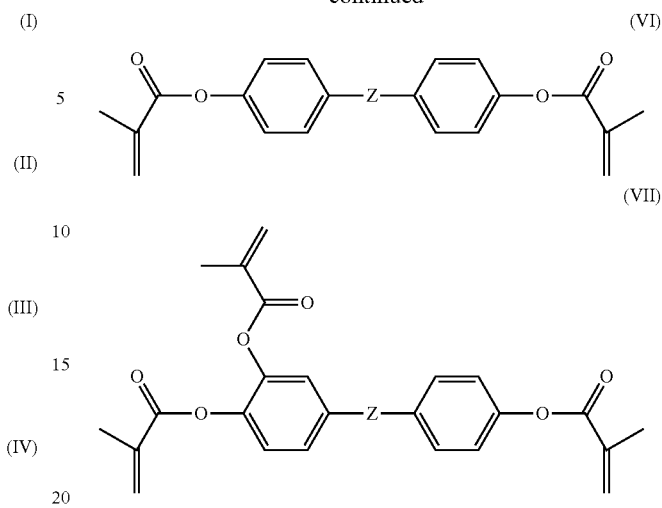

wherein, in formula (V), X is —F or —CN; in formula (VI) and formula (VII), Z is —O—, —COO—, —OCO—, —CH$_2$O—, —O(CH$_2$)$_2$O—, —COCH$_2$—, methylene group, —C≡C—,

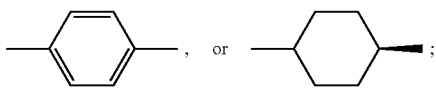

wherein the molar ratio of any one of the at least one reactive monomers is not more than 98% of the total content of the reactive monomers.

6. A liquid crystal composition, comprising:
a liquid crystal material, a stabilizer and a polymerizable mixture, wherein the polymerizable mixture comprises at least one reactive monomer and a photo initiator, wherein the structure of the reactive monomer comprises a single benzene ring, two benzene rings, or a naphthalene ring, wherein the two benzene rings are formed by direct connection of two single benzene rings or indirect connection with a substituent group therebetween, and the photo initiator has the following structure:

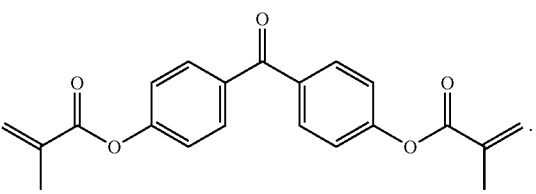 [SMILES: C=C(C)C(=O)Oc1ccc(C(=O)c2ccc(OC(=O)C(=C)C)cc2)cc1]

7. The liquid crystal composition according to claim 6, wherein the weight percentage of the reactive monomers is from 0.1% to 1% based on the total weight of the liquid crystal composition.

8. The liquid crystal composition according to claim 6, wherein the liquid crystal material comprises at least one liquid crystal molecule having the following structural formula:

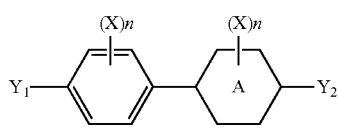

wherein

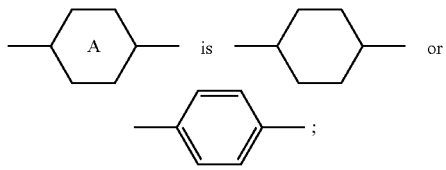

X is the substituted group connected to the ring structure, which is selected from at least one of —H, —Cl, —Br, —I, —CN, or —NO$_2$; n is an integer of 1-4 and is equal or not equal on the different ring; if n>1, the plurality of substituents X are the same or different; $Y_1$ and $Y_2$ can be respectively —R, —OR, —CO—R, —OCO—R, —COO—R, or —(OCH$_2$CH$_2$)$_{n1}$CH$_3$, wherein R represents a linear or branched C$_1$~C$_{12}$ alkyl group, and n1 is an integer of 1-5, wherein $Y_1$ and $Y_2$ are the same or different.

9. The liquid crystal composition according to claim 8, wherein the liquid crystal material is

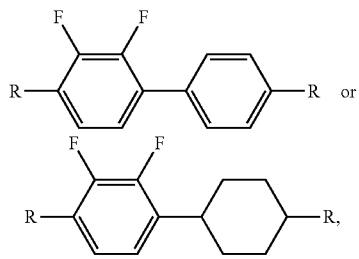

wherein, in the above formula, R is C$_1$~C$_9$ linear or branched alkyl group, and one or more non-adjacent methyl or methylene groups in the alkyl group can be substituted by oxygen or sulfur atoms; the weight percentage of the liquid crystal material is from 20% to 90% based on the total weight of the liquid crystal composition.

10. The liquid crystal composition according to claim 6, wherein the stabilizer comprises at least one stabilizer molecule having the structural formula as follows;

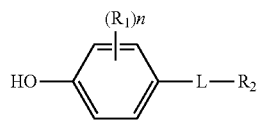

wherein, R$_1$ is at least one of C$_1$~C$_9$ linear or branched alkyl group, n is an integer of 1-4; a plurality of substituent groups R$_1$ are the same or different when n>1; R$_2$ represents C$_1$~C$_{36}$ linear or branched alkyl group; L is —C—C—, —O—, —COO—, —OCO—, —CH$_2$O—, —OCH$_2$O—, —O(CH$_2$)$_2$O—, —COCH$_2$—, or a methylene group.

11. The liquid crystal composition according to claim 10, wherein the stabilizer comprises at least one stabilizer having the structural formula as follows:

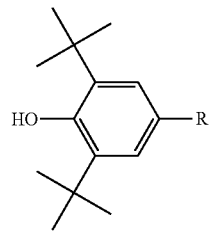

wherein, R is C$_1$~C$_{30}$ linear or branched alkyl group, and one or more non-adjacent methyl or methylene groups in the alkyl group can he substituted by oxygen or sulfur atoms.

12. The liquid crystal composition according to claim 6, wherein the weight percentage of the stabilizer is less than 1% based on the total weight of the liquid crystal composition.

13. The liquid crystal composition according to claim 6, wherein the weight percentage of the photo initiator is from 0.1% to 1% based on the total weight of the liquid crystal composition.

* * * * *